United States Patent [19]

Sliter

[11] Patent Number: 5,404,922

[45] Date of Patent: Apr. 11, 1995

[54] APPARATUS AND METHOD FOR EVENLY DISPENSING GELATIN-BASED SOLUTIONS

[76] Inventor: Spencer Sliter, 4114 Greeley, Houston, Tex. 77006

[21] Appl. No.: 100,728

[22] Filed: Aug. 2, 1993

[51] Int. Cl.⁶ .............................................. B65B 3/00
[52] U.S. Cl. .................................. 141/237; 141/234; 141/244
[58] Field of Search ........ 141/234, 100, 102, 236–240, 141/242–245; 222/478, 479

[56] References Cited

U.S. PATENT DOCUMENTS

| | | | |
|---|---|---|---|
| 642,548 | 1/1900 | Howard | 141/234 |
| 1,488,603 | 4/1924 | Kouwenhoven | |
| 2,191,353 | 5/1957 | Dorn et al. | 141/244 X |
| 2,820,490 | 1/1958 | Hughes | 141/238 |
| 2,857,082 | 10/1958 | Perkins | 222/255 |
| 3,144,538 | 7/1973 | Nasica et al. | 141/242 |
| 3,270,784 | 9/1966 | Mistarz | 141/2 |
| 3,536,449 | 10/1970 | Astle | 141/237 X |
| 4,184,523 | 1/1980 | Carrigan et al. | 141/238 |
| 4,256,153 | 3/1981 | Lamaziere | 141/84 |
| 4,270,584 | 6/1981 | van Lieshout | 141/237 X |
| 4,461,328 | 7/1984 | Kenney | 141/67 |
| 4,512,377 | 4/1985 | Greer | 141/11 |
| 5,105,859 | 4/1992 | Bennett et al. | 141/102 |
| 5,168,905 | 12/1992 | Phallen | 141/237 X |

FOREIGN PATENT DOCUMENTS 0092966 11/1983 European Pat. Off. ............ 141/234

Primary Examiner—J. Casimer Jacyna
Attorney, Agent, or Firm—David M. O'Brian; Alton W. Payne

[57] ABSTRACT

A dispensing apparatus having a dispensing manifold for repetitiously, timely, effeciently and evenly dispensing equivalent amounts of a gelatin-based solution into at least one container. The dispensing manifold includes a horizontal tubular member having a plurality of dispensing nipples mounted laterally thereon. A plurality of discrete dispensing areas are positioned along the tubular member wherein each dispensing area is comprised of one or more dispensing nipples. The design of the dispensing manifold and arrangement of the dispensing nipples allows for equal sized discharges of gelatin-based solution at each dispensing area, wherein the pressure differential remains constant at each discharge area.

8 Claims, 2 Drawing Sheets

APPARATUS AND METHOD FOR EVENLY DISPENSING GELATIN-BASED SOLUTIONS

FIELD OF THE INVENTION

An apparatus for evenly dispensing a gelatin-based solution in equivalent amounts. Specifically, an apparatus using a dispensing manifold for repetitiously, efficiently, timely and evenly dispensing a gelatin-based solution into at least one container, in equivalent amounts, for use in preparing gelatin-based foods and beverages.

BACKGROUND OF THE INVENTION

Dispensing apparatuses for dispensing various foods and beverages are well known. The prior art dispensing devices include U.S. Pat. Nos. 4,461,328, 4,512,377, 4,256,153, 4,184,523, 3,270,784, 2,857,082, 2,820,490 and 1,488,603. One of the primary problems associated with the dispensing of gelatin-based foods and beverages is the uneven distribution of the gelatin-based solution. In the prior art devices, the pressure differential varies at each dispensing area, thus resulting in disproportional amounts of material being dispensed at the dispensing areas. In these devices, the dispensing areas nearest to the inlet of the dispensing manifold tend to dispense more material than the dispensing areas farther removed from the inlet. The pressure differentials successively decrease in the direction opposite from the inlet. This is especially true where the material being dispensed is a gelatin-based solution lacking the flow characteristics of non-gelatin-based solutions and having a greater viscosity than non-gelatin-based solutions.

Preparing and dispensing consistent serving proportions is a favored means of marketing and serving food and beverage products. Most food and beverage products are sold according to weight or volume measurements. Therefore, the ability to repetitously produce precisely measured serving portions of gelatin-based solutions in an efficient and timely manner is of significant importance. In the absence of uniform and consistent serving proportions, the consumer may not obtain the value that was desired. The ability to repetitiously, timely and efficiently dispense gelatin-based foods and beverages is problem not addressed in the prior art. Simplicity of design and the level of skill needed to operate the dispenser is another concern which impacts the dispensing of gelatin-based foods and beverages. If a dispenser is troublesome to operate or requires a great deal of maintenance to remain functional, the effeciency of the operation may be adversely affected.

The known prior art dispensing devices do not evenly dispense equivalent amounts of gelatin-based solutions for producing foods and beverages. Furthermore, the known prior art dispensing devices do not evenly dispense gelatin-based foods and beverages in a repetitious and efficient manner. Additionally, the known prior art dispensing devices require a substantially greater amount of time for cleaning than does the present invention.

Presently, gelatin-based solutions for making foods and beverages are mixed by hand, dispensed by hand and packaged by hand. As the demand for gelatin-based foods and beverages increases, restaurants, bars, schools, hospitals, cafeterias and kitchens of various types, will devote more labor into producing gelatin-based foods and beverages.

The contemporary production of gelatin-based foods and beverages is labor intensive, requiring perhaps numerous personnel to cook and mix the gelatin-based solution, dispense the cooked gelatin-based solution into containers which are then chilled or refrigerated, package and serve the gelatin-based product for consumption by the consumer. Clean-up of the equipment used to produce and package gelatin-based foods and beverages is also time consuming and messy.

Since dispensing apparatuses are a favored means in which to dispense various foods and beverages, it is apparent that there is a need for an apparatus and method for dispensing gelatin-based solutions from an improved dispensing manifold which maintains a constant pressure differential at each dispensing area along the dispensing manifold to repetitiously, dispense gelatin-based solutions in a timely and effecient manner for producing gelatin-based foods and beverages in equivalent proportions. The present invention is constructed of a simple design, requiring little or no maintenance and can be operated with little mechanical skill. Further, the present invention provides for a timely and relatively easy clean-up. When the dispensing operations have been terminated, hot water may be pumped through the apparatus, thus removing the gelatin-based solution from the apparatus. By way of summary, the available art generally fails to meet the needs for repetitiously dispensing equivalent proportions of gelatin-based solutions in a timely and effecient manner.

BRIEF SUMMARY OF THE INVENTION

An apparatus for repetitiously, timely, effeciently and evenly dispensing a gelatin-based solution in equivalent amounts, comprising a dispensing manifold; a dispensing pump having an inlet and an outlet for supplying the gelatin-based solution to said dispensing manifold; a reservoir for storing the gelatin-based solution to be drawn by said pump and dispensed from said dispensing manifold; a first conduit for communicating the gelatin-based solution from said reservoir to said dispensing pump; and a second conduit for communicating the gelatin-based solution from said dispensing pump to said dispensing manifold. The dispensing manifold is preferably removably affixed to one or more manifold supports, wherein the dispensing manifold is mounted in a horizontal manner and having a first inlet end and a second selectively closed distal end. The dispensing manifold includes a plurality of dispensing nipples mounted on the tubular member in distinct groupings and disposed laterally therefrom to evenly and equivalently dispense gelatin-based solutions. The dispensing nipples are preferably hypodermic needles, having a relatively small bore. The dispensing nipples are sufficiently small to restrict the flow of the gelatin-based solution through the dispensing manifold for creating a constant back pressure along an entire length of the dispensing manifold such that the constant back pressure generates an even, uniform discharge of gelatin-based solution through each dispensing nipple. A plurality of dispensing areas are segregated longitudinally along the tubular member, wherein each dispensing area is comprised of one more dispensing nipples. The dispensing nipples are grouped to create multiple dispensing areas which maintain a constant pressure differential at the dispensing areas. Where the pressure differential remains constant at each dispensing area, the gelatin-based solution will be evenly dispensed in equivalent amounts.

The method for evenly dispensing the gelatin-based solution consists of drawing the gelatin-based solution from the reservoir to the pump; pumping the gelatin-based solution to the dispensing manifold; and dispensing the gelatin-based solution through a plurality of dispensing nipples to at least one container. The gelatin-based solutions dispensed from the dispensing apparatus, may for example contain an alcoholic substance, i.e., vodka, rum, grain alcohol or wine. The subsequent chilling of gelatin-based mixtures containing alcoholic substances, form the basis of a popular adult refreshment commonly referred to as "gel-shots." Gelshots are typically sold at bars, restaurants and other establishments where alcohol is sold by the drink.

DESCRIPTION OF THE INVENTION

Figure 2:
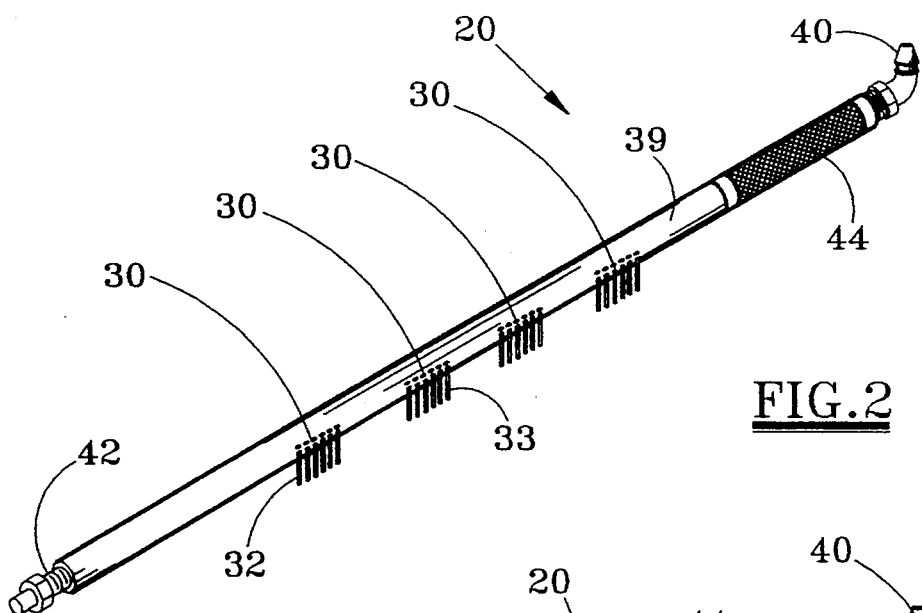
FIG. 2 is a perspective view of the dispensing manifold of the device of FIG. 1.

With reference to the drawings, wherein like parts are designated by like numerals, a dispensing apparatus 10 in accordance with the present invention includes a pump 12 having a dispensing control 13, an inlet 14 and an outlet 16, wherein a gelatin-based solution 18 is drawn into the pump inlet 14 and pumped out of the pump outlet 16 to a dispensing manifold 20. The pump 12 for example may be a Gorman-Rupp Industries standard pump, model no. EX191 192–296. The dispensing manifold 20 is constructed of an FDA approved material, for example polyvinylcarbonate or clear vinyl polyvinylchloride. A reservoir 22 is used to store the gelatin-based solution 18 prior to dispensing said material through the dispensing manifold 20. A first conduit 24 provides communication of the gelatin-based solution 18 from the reservoir 22 to the pump inlet 14. A second conduit 26 communicates the gelatin-based solution 18 from the pump outlet 16 to the dispensing manifold 20. The first conduit 24 and the second conduit 26 may be made of any FDA approved material, for example plastic or rubber. One or more manifold supports 28 may be used to support the dispensing manifold 20 in a horizontal manner. The manifold supports 28 may be constructed of any suitable material, however the manifold supports 28 of the present invention are constructed of aluminum. The dispensing manifold 20 preferably includes a plurality of dispensing areas 30 longitudinally positioned along the manifold 20. As depicted in FIG. 2, each dispensing area 30 is comprised of a plurality of dispensing nipples 32, each of the plurality of dispensing nipples 32 has a nominal diameter bore 33. In the present invention, the plurality of dispensing nipples 32 are preferably constructed of stainless steel or any other FDA approved material and may for example be hypodermic needles. The dispensing nipples 32 are sufficiently small to restrict the flow of the gelatin-based solution 18 through the dispensing manifold 20 for creating a constant back pressure along an entire length of the dispensing manifold 20 such that the constant back pressure generates an even, uniform discharge of gelatin-based solution 18 through each dispensing nipple 32. Underlying each dispensing area 30 is preferably a container 34 into which, the gelatin-based solution 18 is dispensed. The one or more containers 34 are preferably positioned on a tray 36 to facilitate the repetitious, timely and efficient dispensing of the gelatin-based solution 18 into the one or more containers 34.

Figure 1:
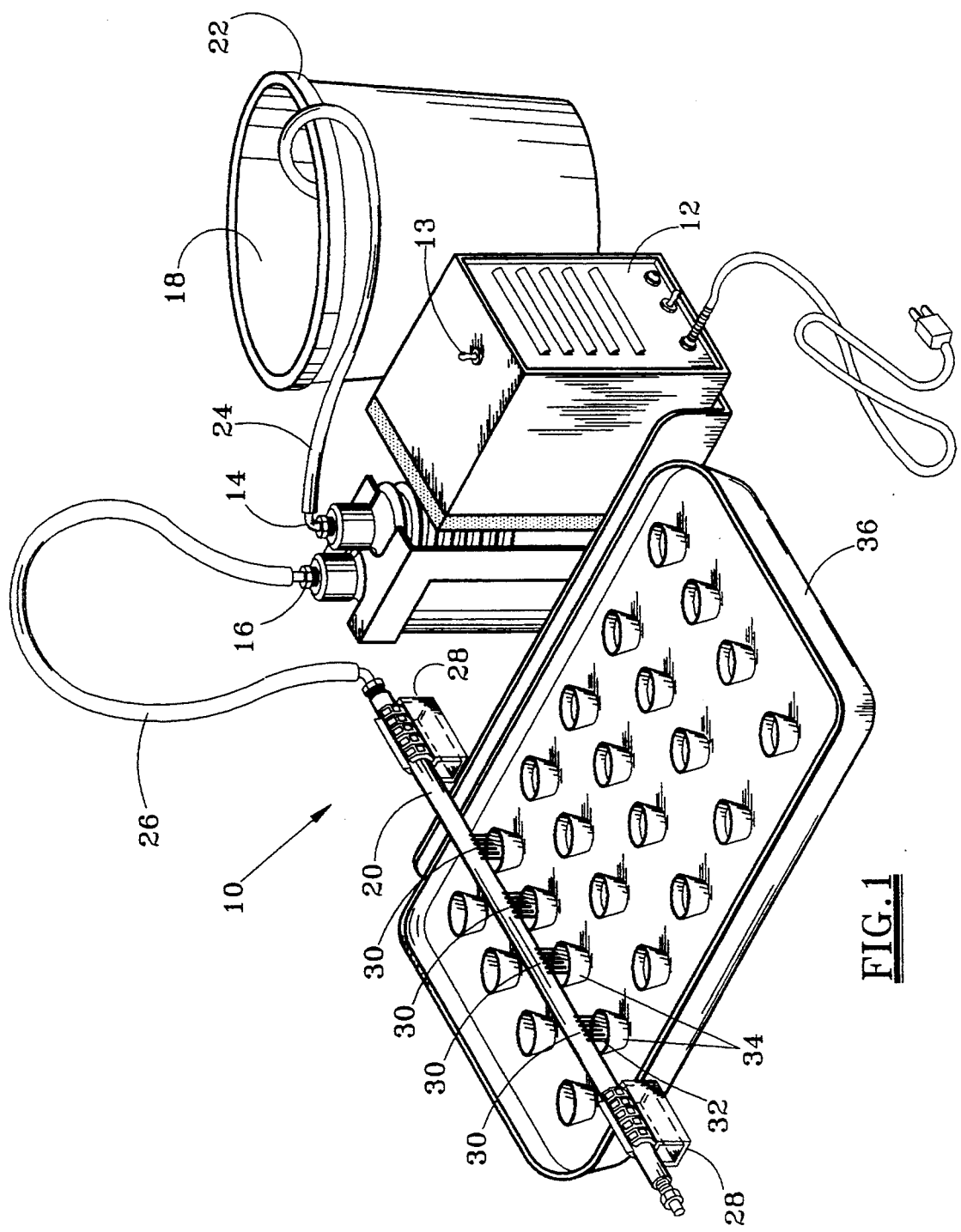
FIG. 1 is a perspective view of an apparatus for evenly dispensing a gelatin-based solution in accordance with the invention.

With reference to FIGS. 1 and 2, the dispensing manifold 20 is depicted in greater detail. The dispensing manifold 20 is generally comprised of a linear tubular member 38 having a central bore 39, a proximal first inlet end 40, a selectively closed second distal end 42 and a plurality of dispensing nipples 32. The dispensing areas 30 are comprised of a plurality of dispensing nipples 32 mounted on the tubular member 38 and disposed laterally therefrom. The plurality of dispensing nipples 32 are in direct communication with the central bore 39, via the nominal diameter bore 33 of each of the plurality of dispensing nipples 32. The dispensing areas 30 are distinctly segregated from one another along the tubular member 38 to provide for efficient filling of one or more containers 34. In the preferred embodiment, each dispensing area 30 is comprised of six dispensing nipples 32. The arrangement of six dispensing nipples 32 to form each dispensing area 30 along the dispensing manifold 20 will provide for a constant pressure differential at each dispensing area 30, thereby evenly dispensing equivalent amounts from each dispensing area 30. The dispensing manifold 20 also includes a hand grip 44 preferably adjacent the inlet 40 of the dispensing manifold 20 to provide for manual positioning of the dispensing manifold 20.

Figure 3:
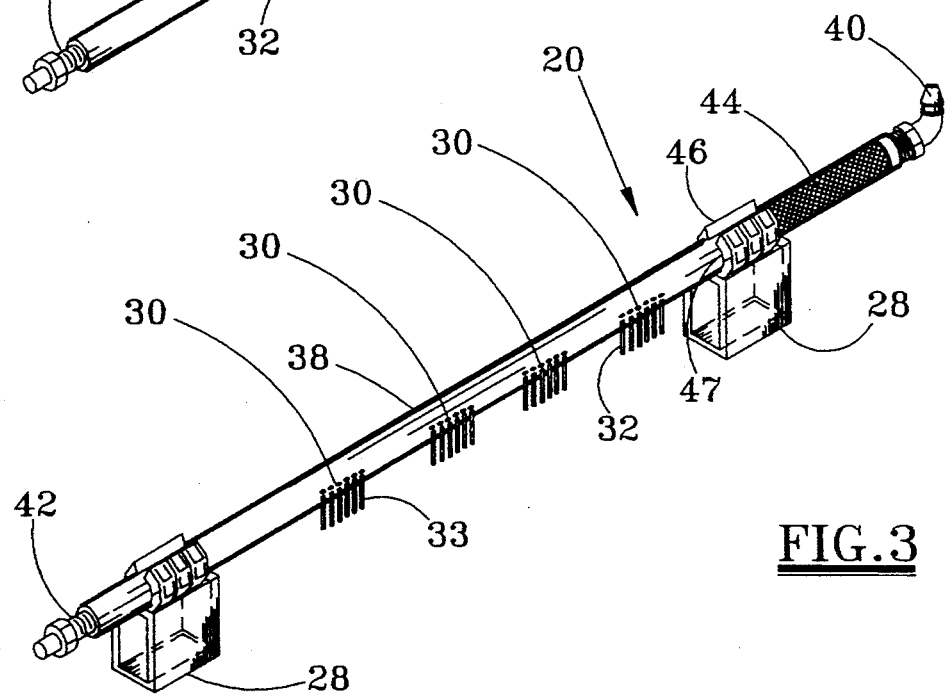
FIG. 3 is a perspective view of the device of FIG. 2 wherein the dispensing manifold is mounted by two manifold supports.

FIG. 3 more clearly illustrates the relationship between the dispensing manifold 20 and the one or more dispensing manifold supports 28. The one or more manifold supports 28 elevate the dispensing manifold 20 while positioning said manifold 20 in a horizontal manner to facilitate the positioning of the dispensing nipples 32 above the one or more containers 34 for dispensing the gelatin-based solution 18. The dispensing manifold 20 preferably, slidably engages a clasp 46 connected to the manifold support 28 and has a concentric, semi-circular longitudinal bore 47, wherein the dispensing manifold 20 depends through said bore 47.

Figure 4:
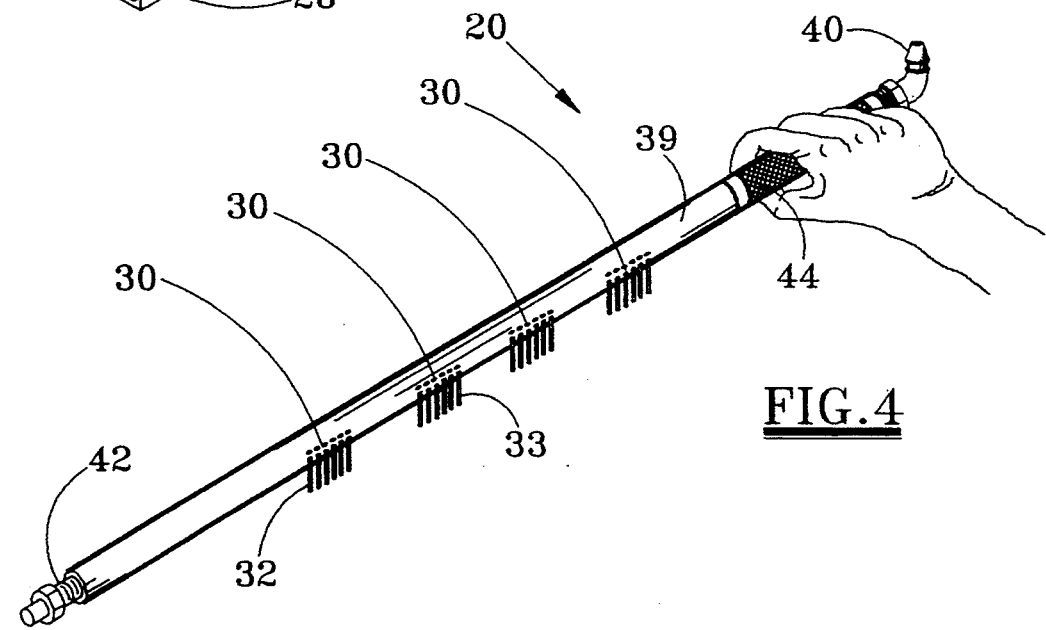
FIG. 4 is perspective view of the device of FIG. 2, illustrating the "hand-held" feature of the dispensing manifold.

FIG. 4 illustrates the ease with which the dispensing manifold 20 may be manually positioned.

OPERATION

In operation, when the pump control 13 is engaged, the pump 12 draws a pre-determined amount of gelatin-based solution 18 from the reservoir 22, via the first conduit 24 into the pump inlet 14 as a result of the suction created by the pump 12. The pump 12 then discharges the gelatin-based solution 18 through the pump outlet 16 into the second conduit 26 which spans the pump outlet 16 and the first inlet 40 of the dispensing manifold 20. The pump 12 delivers premeasured discharges of the gelatin-based solution 18 to the dispensing manifold 20, wherein the dispensing manifold 20 evenly dispenses equal amounts of gelatin-based solution 18 through the one or more dispensing nipples 32 at each dispensing area 30 into one or more containers 34. The arrangement, quantity, and bore diameter of the dispensing nipples 32 at each dispensing area 30 can be adjusted for efficient dispensing of the gelatin-based solution 18 while maintaining a constant pressure differential at each dispensing area 30. Further, the nominal diameters of the dispensing nipple bores 33, prevents unintentional leaking of the gelatin-based solution 18 from the dispensing manifold 20. A positive force is required to dispense the gelatin-based solution 18 from the manifold 20. After each discharge of gelatin-based solution 18 is pumped from the pump outlet 16 through the second conduit 26 to the dispensing manifold 20 and in turn, filling a desired number of containers 34, the tray 36 is advanced to position one or more empty containers 34 under the dispensing nipples 32. In this manner, the containers 34 may be repetitiously, timely, efficiently and equivalently filled with the gelatin-based solution 18. The filled containers 34 are then chilled or refrigerated until the gelatin-based fluid 18 has become gelled.

The method for evenly dispensing the gelatin-based solution consists of drawing the gelatin-based solution 18 from the reservoir 22 and in to the pump 12; pumping the gelatin-based solution 18 to the dispensing manifold 20; and dispensing the gelatin-based solution 18 through a plurality of dispensing nipples 32 to at least one container 34.

After a desired number of containers 34 have been filled and it is desired to terminate the dispensing operations, the apparatus 10 may be easily cleaned by removing the gelatin-based solution 18 and filling the reservoir 22 with hot water (not shown) and drawing the hot water through the first conduit 24 and pump inlet 14 and pumping the hot water through the second conduit 26 and dispensing manifold 20 until the gelatin-based solution 18 is removed from the apparatus 10.

It will be appreciated that these and other embodiments may be provided so as to more efficiently and evenly dispense gelatin-based solutions. Additional embodiments become readily apparent when the concept of the present invention is understood as described hereinabove. Having described the invention above, variations, modifications of the techniques, procedures, material and equipment will be apparent to those skilled in the art. It is intended that all such variations within the scope and spirit of the appended claims be embraced thereby.

What is claimed is:

1. An apparatus for evenly dispensing equivalent amounts of a gelatin-based solution into a plurality of containers, comprising:

a dispensing manifold consisting of a horizontally mounted tubular member having a central bore and a plurality of dispensing areas longitudinally positioned along the tubular member, wherein the central bore has a proximal first inlet end and a selectively closed second distal end and a plurality of dispensing nipples located at each dispensing area with each dispensing area being adapted to dispense an equivalent amount of solution into a single container, each dispensing nipple having a small nominal diameter bore and being mounted on the tubular member and disposed laterally therefrom, wherein the small nominal diameter dispensing nipple bore is in fluid communication with the central bore; the plurality of dispensing nipples being sufficiently small to restrict the flow of the gelatin-based solution through said dispensing manifold for creating a constant back pressure along an entire length of said dispensing manifold such that the constant back pressure generates an even, uniform discharge of gelatin-based solution through each of the plurality of dispensing nipples;

a dispensing pump having an inlet and an outlet for supplying the gelatin-based solution to said dispensing manifold;

a reservoir for containing the gelatin-based solution to be dispensed from said dispensing manifold;

a first conduit for transferring the gelatin-based solution from said reservoir to said dispensing pump; and a second conduit for transferring the gelatin-based solution from said dispensing pump to said dispensing manifold.

2. An apparatus for evenly dispensing equivalent amounts of a gelatin-based solution, as defined in claim 1, wherein the dispensing manifold further comprises:

one or more supports for horizontally mounting the tubular member above one or more containers.

3. An apparatus for evenly dispensing an equivalent amount of a gelatin-based solution, as defined in claim 2, wherein the dispensing manifold is removeably attached to the dispensing pump.

4. An apparatus for evenly dispensing an equivalent amount of a gelatin-based solution, as defined in claim 3 wherein each of the plurality of dispensing nipples is comprised of a hypodermic needle.

5. An apparatus for evenly dispensing an equivalent amount of a gelatin-based solution, as defined in claim 4, wherein the pressure differential is constant at each of the plurality of dispensing areas and equal amounts of gelatin-based solution is dispensed from each of the plurality of dispensing areas.

6. An apparatus for evenly dispensing an equivalent amount of a gelatin-based solution, as defined in claim 5, wherein said apparatus may be easily cleaned by removing the gelatin-based solution from the reservoir, filling the reservoir with a quantity of hot water and pumping the hot water through said apparatus until the gelatin-based solution has been removed.

7. An apparatus for evenly dispensing an equivalent amount of a gelatin-based solution, as defined in claim 6, wherein a quantity of alcohol is mixed with the gelatin-based solution to produce a gelatin-based alcoholic food.

8. An apparatus for evenly dispensing an equivalent amount of a gelatin-based solution, as defined in claim 6, wherein a quantity of alcohol is mixed with the gelatin-based solution to produce a gelatin-based alcoholic beverage.

* * * * *